UNITED STATES PATENT OFFICE.

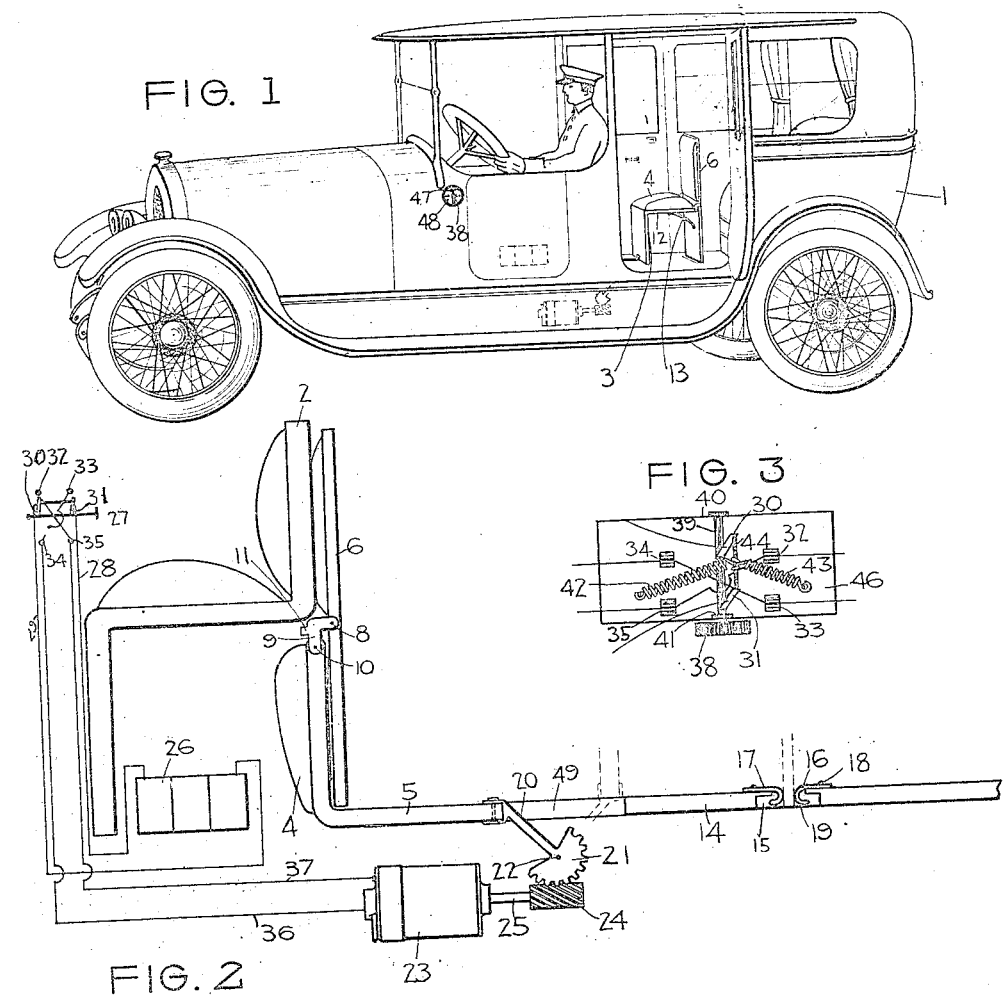

FLORENCE B. VOGEL, OF NEW YORK, N. Y.

MOTOR-VEHICLE SEAT.

1,285,483.

Specification of Letters Patent.  Patented Nov. 19, 1918.

Application filed May 26, 1917. Serial No. 171,075.

*To all whom it may concern:*

Be it known that I, FLORENCE B. VOGEL, a citizen of the United States, and a resident of the borough of Manhattan, in the city, county, and State of New York, have invented an Improvement in Motor-Vehicle Seats, of which the following is a specification.

This invention relates to motor vehicles, more particularly to means for securing convenience and comfort in the use of fine cars. One of the objects of this invention is to provide practical and automatic means whereby an extra seat of an automobile may be automatically moved from inoperative into operative position.

Another object is to provide means of the above type of simple, durable and relatively inexpensive construction.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings wherein is shown one of various possible embodiments of the several features of the invention, Figure 1 is a perspective view of an automobile showing an extra seat in operative position, the battery, motor and switch being separately shown without regard to their perspective relation to the rest of the figure and without showing electrical connections.

Fig. 2 is a side view showing the extra seat in its out-of-the-way position and completely indicating the electrical circuits.

Fig. 3 is a detail view of the reversing switch.

Similar reference characters refer to similar parts throughout the different views of the drawings.

Referring now to Fig. 1 of these drawings, there is shown an automobile 1, the construction of which need not be described in detail. This automobile has any usual form of front seat 2, and an extra seat 3, normally in an inobtrusive and useless position, as shown in Fig. 2, but adapted to be placed in operative position as shown in Fig. 1. This seat has a seat portion 4 and a front portion 5 at right angles thereto and rigid therewith. The back 6 is in hinged relation to the seat portion as shown, the hinge being indicated at 8, as passing through angle irons 9 firmly secured preferably to opposite sides of the seat portion as shown at 10. The distance from the hinge 8 to the front portion 5 of the seat is slightly in excess of the distance from this point to the bottom of the back to facilitate folding the rear portion under the bottom as shown in Fig. 2. Preferably integral with the angle iron 9, there is a lug or extension 11, which rests on a rigid portion 12 of the seat 4 when the seat is in the position shown in Fig. 1.

A leaf spring 13 has one end secured to the bottom of seat portion 4 and is curved to have its other end tangential to the back portion 6, the lug 11 by its contact with the seat portion preventing spring 13 from moving the back 6 past its operative position.

The floor of the car 14 preferably has a groove 15 therein substantially as long as the extra seat is wide, the back portion 6 being adapted to rest in said groove, a spring clip consisting of coöperating elements 16 and 17 secured to the floor of the car as at 18 and having their free ends rounded and extending into the groove as shown at 19, maintains the back of the seat in secure but yielding relation. Rigidly secured preferably to the bottom of the front portion 5 of the extra seat, there is an arm 20 preferably integral with a sectorial gear 21 having an axis 22. An electric motor 23 is adapted to drive the gear 21 through the coöperating gear element 24, which latter element is preferably mounted on the motor shaft 25. The preferred form of gear connection as shown is that of worm and worm wheel. The motor 23 is operated from the storage battery 26. A separate storage battery for the purpose of this invention is, of course, unnecessary, the usual storage battery on automobiles being sufficient to perform the additional seat adjusting function. The storage battery may be connected to the motor by a reversing switch 27 conventionally shown in Fig. 2, the terminals of the battery 26 being connected by leads 28 and 29 to the hinged ends of switch bars 30 and 31 respectively. The switch terminals 32, 33, 34 and 35 are cross connected as customary in reversing switches and are connected by leads 36, and 37 to the motor 23.

The switch construction is shown in detail in Fig. 3. The switch is shown in the form of a knife switch, the blades 30 and 31 being adapted to coöperate with clips 32 and 33 respectively, or 34 and 35 respectively, depending upon the direction in which the switch is thrown. For neatness of construction and efficiency in operation, the knife switch described is preferably operated by means of a turn button 38, rigidly connected to a shaft 39 made of insulating material fitting in bearings 40 and 41, and having rigidly secured thereto one end of each of the knife elements 30 and 31. Two similar coil springs 42 and 43 are connected on opposite sides to insulating cross bar 44, which connects the free ends of knife switch element 30 and 31 and thus maintains the switch in open position. The free ends of the coil springs 42 and 43 are secured to the switch base 46 as shown.

The turn button 38 is preferably formed with an index end 47 and the switch dial 48 has the indications "R" and "L" designating raise and lower to show in which direction the turn button must be operated in order to cause the motor to move the seat in the proper direction.

The operation of the above described embodiment of this invention is substantially, as follows: assuming the seat in operative position as shown in Fig. 1 and that it be desired to fold up the seat, the switch button 38 is turned to "L", lower. This turns the shaft 39 and with it the knife switch contacts 30 and 31 to coöperate with clips 32 and 33, and will cause extension of spring 42, whereby current flows from the battery 26 by way of lead 28, knife switch 31, lead 36 to the motor and back through lead 37, knife switch element 30 and lead 29 back to the battery. The motor being set into operation, the worm 24 causes the sectorial worm wheel 21 to turn in a counter-clockwise direction and the seat therefore, rotates about axis 22. This causes the back 6 to move out of engagement with clip element 17—18. The rotation of seat 3 about axis 22 will continue until the front portion 5 rests on the floor of the car as shown in Fig. 2, bar 20 traveling in a slit 49 in the floor of the car. Before front 5 reaches the position shown in Fig. 2, the back of the seat is arrested by the back of the front seat 2. This, as is obvious, will cause back 6 to rotate about hinge 8 and assume the position shown in Fig. 2, in which it overlaps the back of the front seat and the seat portion of the extra seat. The extra seat is thus automatically gotten out of the way. When this occurs the operator lets go of turn button 38 and extended spring 42 in contracting will return the switch to open position and will thus disconnect the motor from the battery.

Assuming the seat in the inobtrusive position shown in Fig. 2, to move it into operative position, all it is necessary to do is to move the turn button to position "R" raise. The current will then be led in motor 23 in a direction opposite to that heretofore described, and the operation will take place substantially as above described, except of course, that the steps are in the reverse order. As the part 5 is raised and the back portion 6 moves away from front seat 2, the spring 13 will move the back 6 to occupy a position at right angles to the seat portion and the rounded portions of spring element 17 and 18 will near the end of the movement to operative position help to guide the back portion 6 into groove 15 as shown in dotted lines in Fig. 2, and will effectively hold this back.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a motor vehicle, in combination, an extra seat having a back biased to operative position with respect to the seat portion, a motor operatively connected to the front of said extra seat for turning said front about an axis through approximately a right angle, to lie on the floor of said motor vehicle, an immovable element in said motor vehicle, said back of said extra seat being stopped by said immovable element as said seat is moved into inoperative position, whereby said extra seat will be automatically moved to inobtrusive position.

2. In a motor vehicle, in combination, a front seat, an extra seat, including a seat portion and a back portion, a spring interposed between said latter members for biasing them to operative relation with respect to each other, an electric motor, means mechanically connecting said motor to the front of said seat, whereby when said motor is set into operation, said front part of said seat will be rotated to lie on said floor, said back portion thereof will be limited in its movement upon touching the back of said front seat thus moving said back against the back of said front seat, whereby said seat is placed in inobtrusive position.

3. In a motor vehicle, in combination, an extra seat adapted to be placed into inoperative position, said extra seat including a seat portion and a front portion rigid with respect to each other, a back portion hinged with respect to said seat portion, a spring interposed between said seat portion and said back portion for biasing said back portion into operative relation with respect to said seat portion, a motor and a transmission, both disposed below the floor of said vehicle, and adapted to turn the front of said extra seat from vertical to horizontal or from horizontal to vertical position, and an immovable member for compelling said back to assume a vertical position against the bias of said spring, when said front is moved to horizontal position.

4. In a motor vehicle, in combination, an extra seat including a seat portion and a front portion rigid with respect to each other, a back portion hinged to said seat portion, the distance from said hinge to said front portion being not less than the distance from said hinge to the bottom of said back portion, a spring between said back portion and said seat portion biasing said latter elements into operative relation with respect to each other, an electric motor, power transmission means between said motor and the front of said extra seat, said transmission means including a worm driven from said motor and a worm-wheel rigidly connected with said front portion, spring clip means in the floor of said motor vehicle, whereby when said motor is set into operation, said seat portion will be rotated into operative position, said back portion will be moved by said spring into operative relation with respect to said seat portion and said spring clips will yieldingly maintain said back portion in operative position.

5. In a motor vehicle, in combination, a front seat, an extra seat including a seat portion and a front portion in rigid relation with respect to each other, a back portion in hinged relation to said seat portion and biased to operative relation with respect to said seat portion, spring clips in the floor of said motor vehicle, said back portion being maintained in position by said clips, a sectorial worm wheel rotatable about a fixed axis, and rigidly connected to said front portion, an electric motor, a worm adapted to be driven from said motor and coöperating with said worm-wheel, a reversing switch for enabling said motor to rotate in either direction whereby when said motor is set into operation in the proper direction said worm will turn said worm wheel and will move the front of said seat to lie on the floor of said motor vehicle, the seat portion of said seat to assume a position substantially perpendicular to said floor and the back of said seat to be arrested by said front seat and thus overlap the back of said front seat and the bottom of said seat portion.

In testimony whereof, I have signed my name to this specification this 18 day of May, 1917.

FLORENCE B. VOGEL.